(12) United States Patent
Ashida et al.

(10) Patent No.: US 7,925,725 B2
(45) Date of Patent: Apr. 12, 2011

(54) INFORMATION PROCESSING APPARATUS, METHOD, AND PROGRAM FOR GENERATING SETTING INFORMATION FOR ELECTRONIC DEVICE

(75) Inventors: Takashi Ashida, Kanagawa-ken (JP); Yasutaka Kanayama, Tokyo (JP); Nao Takekawa, Kanagawa-ken (JP); Hiroyuki Tanaka, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 11/862,734

(22) Filed: Sep. 27, 2007

(65) Prior Publication Data
US 2008/0162629 A1 Jul. 3, 2008

(30) Foreign Application Priority Data
Dec. 27, 2006 (JP) .................................. 2006-351649

(51) Int. Cl.
*G06F 15/177* (2006.01)

(52) U.S. Cl. ...... 709/221; 709/203; 358/1.13; 358/1.15; 358/1.18; 710/8

(58) Field of Classification Search .................. 709/203; 358/1.13, 1.15, 1.18; 710/8
See application file for complete search history.

(56) References Cited

U.S. PATENT DOCUMENTS

| 2003/0056176 | A1* | 3/2003 | Tanaka et al. ................. 715/522 |
| 2005/0146731 | A1* | 7/2005 | Mitani ........................... 358/1.1 |
| 2006/0238789 | A1* | 10/2006 | Pesar ........................... 358/1.13 |
| 2006/0238799 | A1* | 10/2006 | Kidokoro ..................... 358/1.15 |
| 2007/0296995 | A1* | 12/2007 | Sakura ......................... 358/1.13 |

FOREIGN PATENT DOCUMENTS

| JP |  | 2000242597 |  | 9/2000 |
| JP | PUPA | 2000-242597 | A1 | 9/2000 |
| JP |  | 2001233534 |  | 8/2001 |
| JP | PUPA | 2001-233534 | A | 8/2001 |
| JP |  | 2005158051 |  | 6/2005 |
| JP |  | 2005-197935 |  | 7/2005 |
| JP |  | 2005197935 |  | 7/2005 |
| JP | PUPA | 2005-197935 | A |  7/2005 |
| JP |  | 2006236382 |  | 9/2006 |
| JP |  | 2007058563 |  | 3/2007 |

* cited by examiner

*Primary Examiner* — Wing F Chan
*Assistant Examiner* — Hitesh Patel
(74) *Attorney, Agent, or Firm* — James Nock; Shimokaji & Associates, P.C.

(57) ABSTRACT

The present invention provides an apparatus, method, and program for automatically generating setting information for a different model on the basis of settings previously made. Additionally, the present invention is directed to automatically determining one piece of setting information to be set for a different model on the basis of settings previously made. The present invention is also directed to automatically generating, on the basis of settings previously made, setting information that is to be set for a different model and that meets the user's intention.

3 Claims, 15 Drawing Sheets

| FIRST SETTING \ SECOND SETTING | STAPLE | PUNCH | 2in1 | DUPLEX |
|---|---|---|---|---|
| STAPLE |  | × | STAPLE=OFF | × |
| PUNCH | × |  | × | ○ |
| 2in1 | STAPLE=OFF | × |  | ○ |
| DUPLEX | DUPLEX=OFF | ○ | ○ |  |

(b)

|  | SETTINGS BEFORE MODEL CHANGE | POSSIBLE RESULT 1 | POSSIBLE RESULT 2 |
|---|---|---|---|
| STAPLE | OFF | OFF | OFF |
| PUNCH | ON | ON | OFF |
| 2in1 | ON | OFF | ON |
| DUPLEX | ON | ON | ON |

FIG. 3

| SETTING ITEM | SETTING VALUE |
|---|---|
| PAPER SIZE | A3, A4, A5, A6, B4, B5, B6, LETTER, ... |
| SCALING | NONE, 10%-500% |
| STAPLE | NONE, 1 POINT, 2 POINTS, 3 POINTS,... |
| STAPLE POSITION | NONE, LEFT, UPPER LEFT, UPPER, UPPER RIGHT,... |
| PUNCH | NONE, 2 HOLES, 3 HOLES, 4 HOLES,... |
| AGGREGATION | NONE, 2in1, 4in1, 6in1,... |
| SORT | ON, OFF |
| DUPLEX | NONE, LONG EDGE BINDING, SHORT EDGE BINDING |
| BOOKLET | NONE, LEFT BINDING, RIGHT BINDING, TOP BINDING |
| IMAGE QUALITY | QUICK, NORMAL, FINE |
| ECONOMY | ON, OFF |
| COLOR/MONOCHROME | ON, OFF |
| LEFT/RIGHT INVERSION | ON, OFF |
| BLACK/WHITE INVERSION | ON, OFF |

FIG. 4
(a)
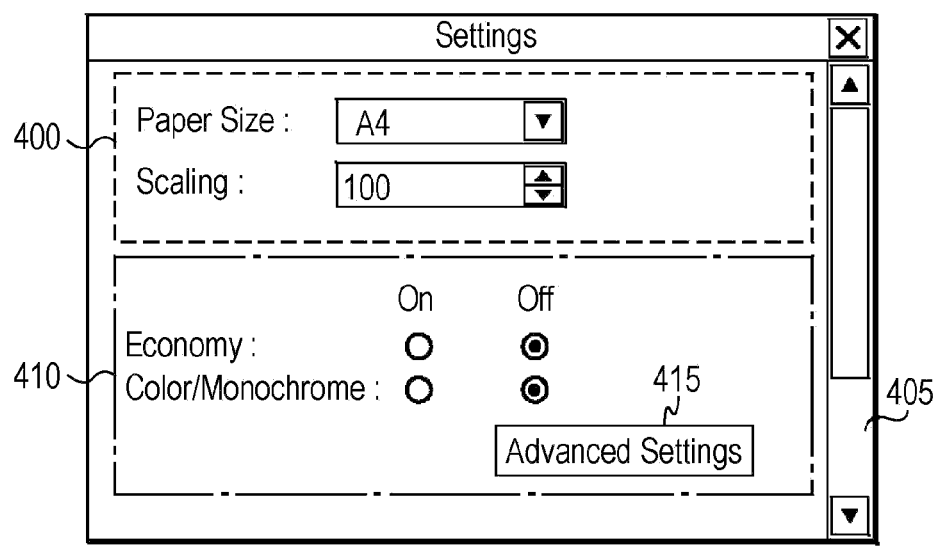
(b)
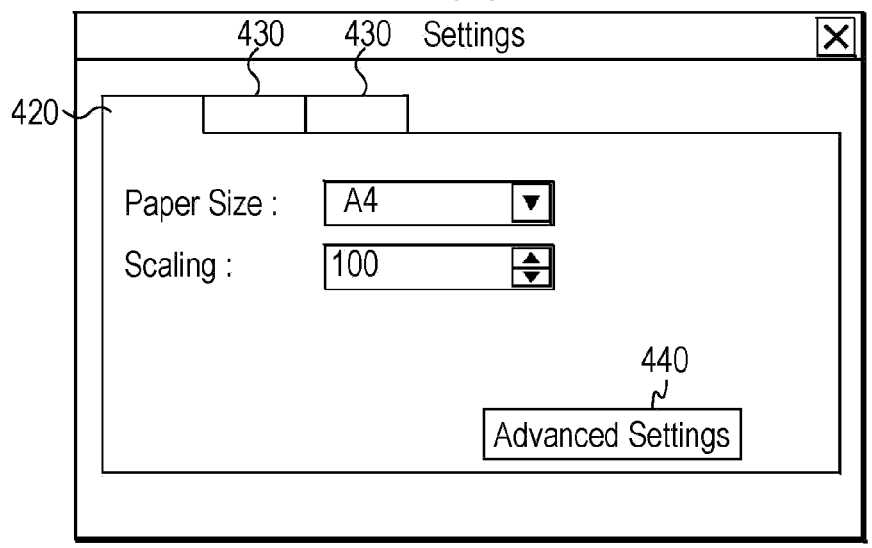
(c)
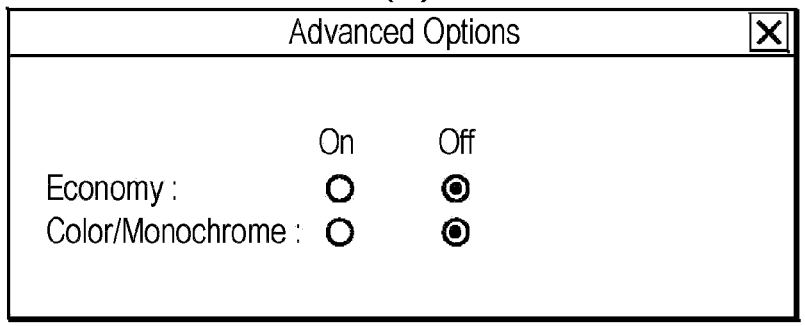

FIG. 5

| SETTING INFORMATION | COMMON SETTING VALUE |
|---|---|
| 1 | STAPLE = 2 POINTS |
| 2 | DUPLEX = SHORT EDGE BINDING |
| 3 | IMAGE QUALITY = QUICK |
| 4 | ECONOMY = ON |
| ... | ... |

FIG. 6

| | FIRST SETTING | SECOND SETTING | APPLICATION RULE |
|---|---|---|---|
| 1 | PRIORITY ITEM | NON-PRIORITY ITEM | PRIORITY: FIRST |
| 2 | NON-PRIORITY ITEM | PRIORITY ITEM | PRIORITY: FIRST |
| 3 | PRIORITY ITEM | PRIORITY ITEM | PRIORITY: SECOND |
| 4 | NON-PRIORITY ITEM | NON-PRIORITY ITEM | PRIORITY: SECOND |

|  | SECOND SETTING | | | |
|---|---|---|---|---|
| FIRST SETTING | | STAPLE | PUNCH | 2in1 | DUPLEX |
| | STAPLE | | STAPLE=OFF | × | × |
| | PUNCH | PUNCH=OFF | | × | ○ |
| | 2in1 | × | × | | ○ |
| | DUPLEX | × | ○ | ○ | |

(b)

| | SETTINGS BEFORE MODEL CHANGE | POSSIBLE RESULT 1 | POSSIBLE RESULT 2 |
|---|---|---|---|
| STAPLE | OFF | OFF | OFF |
| PUNCH | ON | ON | OFF |
| 2in1 | ON | OFF | ON |
| DUPLEX | ON | ON | ON |

(c)

| | DEFAULT | FIRST SETTING (PUNCH=ON) | SECOND SETTING (2in1=ON) | THIRD SETTING (DUPLEX=ON) | RESULT |
|---|---|---|---|---|---|
| STAPLE | OFF | OFF | OFF | OFF | OFF |
| PUNCH | OFF | ON | ON | ON | ON |
| 2in1 | OFF | OFF | OFF | OFF | OFF |
| DUPLEX | OFF | OFF | OFF | ON | ON |

# INFORMATION PROCESSING APPARATUS, METHOD, AND PROGRAM FOR GENERATING SETTING INFORMATION FOR ELECTRONIC DEVICE

FIELD OF THE INVENTION

The present invention relates to techniques for generating setting information that specifies a method of processing to be performed by an electronic device, which is capable of providing such processing capabilities. The present invention particularly relates to a technique for automatically generating setting information for a different model of electronic device on the basis of settings previously made.

BACKGROUND OF THE INVENTION

Even among electronic devices of the same type, their settings vary depending on the model. Therefore, if a model is changed by replacement of an electronic device or if models of electronic devices used are different by location (e.g., a school, workplace, or home), it is necessary to make settings every time the model is changed. To avoid such cumbersome operations, it may be possible that a computer automatically makes settings for a different model of electronic device by using settings previously made. However, this approach has a serious problem to be solved.

Typically, there are two types of setting rules, explicit and implicit rules, to be followed in making settings for an electronic device. One is a constraint rule relating to ranges of setting values. For example, a printer follows a constraint rule, such as "the print margin should be within a range of 10 mm to 30 mm". The other is a constraint rule relating to dependencies between setting values. For example, a printer follows a constraint rule, such as "it is not allowed to simultaneously specify both "staple" and "hole punch" settings, and when a "staple" setting is specified, a "hole punch" setting is cancelled".

Even if settings previously made for one model cannot be directly used for another model, a problem associated with application of the former constraint rule (which relates to ranges of setting values) can be solved by a simple method. That is, for a model that differs in the range of setting values, a value outside an allowable range can be "rounded" to an appropriate value within the allowable range. For example, if a paper size selected for a first model of printer is not applicable to a second model, a paper size that is within an allowable range and nearest to the paper size selected for the first model can be selected for the second model.

However, as for the latter constraint rule (which relates to dependencies between setting values), it is not easy to solve the associated problem. This will be described with reference to FIG. 1(a) and FIG. 1(b). FIG. 1(a) is a table showing exemplary constraint rules that are based on dependencies between setting values and are applied to a printer of Model X. As shown in the table, under the constraint rules, "2 in 1" cannot be set to ON after "punch" is set to ON. Conversely, "punch" cannot be set to ON after "2 in 1" is set to ON. In this way, constraint rules based on dependencies between setting values are dependent on the order of setting.

More specifically, for illustrative purposes, there will be described a case where a printer currently used is changed to a printer of Model X to which the constraint rules of FIG. 1(a) are applied. For ease of understanding, there are provided four setting items, and settings for the printer before the model change are specified as follows: staple=OFF, punch=ON, 2 in 1=ON, and duplex=ON. Then, to these settings before the model change, the constraint rules of FIG. 1(a) are applied. This gives, as shown in FIG. 1(b), two possible results depending on the order of setting. In possible result 1, a setting for "2 in 1" is made after a setting for "punch" is made. In possible result 2, a setting for "punch" is made after a setting for "2 in 1" is made. It is to be noted that although two possible results are obtained in this example, the number of possible results increases as the number of setting items increases.

As described above, it is possible for a computer to automatically determine settings for a new model by using settings for an electronic device before the model change. However, application of constraint rules based on dependencies between setting values gives a plurality of sets of settings as candidates and thus, it is not possible to determine a single set of settings to be made for the new model. Additionally, when a model of electronic device used is changed to a new model with higher performance, if setting items that are not available for previous models are made available for the new model, it is not possible to generate settings for the new model by using settings for the previous model.

As a solution to this, Japanese Unexamined Patent Application Publication No. 2005-197935 discloses a supporting apparatus which supports generation of collective setting information and is used to make settings for a plurality of target devices connected to a network. This supporting apparatus obtains, from a device connected to the network, setting information set for the device. Then, the supporting apparatus displays the obtained setting information on a display screen and accepts, from the user, editing operations (e.g., addition, modification, and deletion) to be performed on the setting information. In response to an instruction from the user, the supporting apparatus accepts setting information obtained from a device or information obtained by editing the setting information, as device setting information.

SUMMARY OF THE INVENTION

Problems to be Solved by the Invention

The above-described technique requires the user to perform editing operation when addition, modification, or deletion of information is needed to generate setting information for a target device on the basis of setting information set for another device. This is still a burden to the user while the above-described technique eliminates the need for creating settings from scratch.

Accordingly, the present invention provides an apparatus, method, and program for automatically generating setting information for a different model on the basis of settings previously made. Additionally, the present invention is directed to automatically determining one piece of setting information to be set for a different model on the basis of settings previously made. The present invention is also directed to automatically generating, on the basis of settings previously made, setting information that is to be set for a different model and that meets the user's intention.

Means for Solving the Problems

The present invention can be realized by a program for generating setting information which specifies a method of processing to be provided by an electronic device. The program causes an information processing apparatus to execute (a) a generating step of referring to a set of common setting items which is a collection of setting items of a plurality of electronic device models, and generating an entry screen which enables a user who wishes to use the electronic device to make settings for the set of common setting items, (b) a receiving step of receiving a plurality of setting values entered from the entry screen by the user, (c) a storage step of associating each of the received setting values with a corresponding common setting item and order in which the user entered the setting value, and storing the resulting information as common setting information in a common setting storage unit, and (d) a converting step of reading, for generating setting information for one of the plurality of models of the electronic device, each of the setting values from the common setting storage unit in the order, referring to constraint information that is dependent on setting order of setting values and is to be applied to the one model, and converting each of the read setting values to a setting value to be set for the one model.

Here, the electronic device which provides processing may be any device to which the information processing apparatus can connect and make processing requests. Examples of such electronic devices include printers, copiers, facsimiles, and scanners. The converting step (d) includes a changing step of changing, when the constraint information dependent on setting order of setting values does not allow simultaneous setting of a first setting value read from the common setting storage unit in the order and a second value that is to be set for the one model and is a value obtained by converting a setting value read before the first setting value was read, one of the first setting value and the second setting value according to the constraint information.

Preferably, the generating step (a) includes a dividing step of dividing the common setting items into priority items and non-priority items on the basis of a frequency of setting, and a generating step of generating an entry screen such that common setting items categorized as the priority items are displayed above the non-priority items on the entry screen. Instead of or in addition to the setting frequency, the degree of effects on processing results or the level of detail of setting may be used to divide the common setting items into priority items and non-priority items.

More preferably, the constraint information gives instructions such that the second setting value is changed when a common setting item corresponding to the first setting value and a common setting item corresponding to the second setting value are in the same category and that the first setting value is changed when a common setting item corresponding to the first setting value and a common setting item corresponding to the second setting value are in different categories.

Preferably, the converting step (d) further includes a recording step of recording, when one of the first setting value and the second setting value has been changed, information about the change. At the same time, the program further causes the information processing apparatus to execute a generating step (e) of generating a confirmation screen which enables the user to confirm the change.

More preferably, the program further causes the information processing apparatus to execute a receiving step of receiving a correction value entered from the confirmation screen by the user. At the same time, the converting step (d) further includes a referring step of referring to the correction value so as to generate a setting value to be set for a model different from the one model.

Preferably, the information processing apparatus is an information processing apparatus that can connect to a plurality of models of electronic devices and make processing requests. More preferably, the program which causes the information processing apparatus to execute the converting step (d) is a driver included in an electronic device of the one model and running on the information processing apparatus. More preferably, the constraint information that is dependent on setting order of setting values and is applied to the one model is updated when the driver is updated.

Preferably, the information processing apparatus is a server connected via a network to a client that can connect to a plurality of models of electronic devices and make processing requests. The server executes the steps (a) through (c) in response to receipt from the client of a request for generating common setting information. The server also executes, in response to receipt from the client of a conversion request specifying a model of an electronic device to be used, the converting step (d) for the specified model, that is, for the one model. More preferably, the constraint information that is dependent on setting order of setting values and is adopted by the one model is downloaded from the network to which the server is connected.

Although the present invention has been described as a program for generating setting information, the present invention may also be viewed as a method or information processing apparatus for generating setting information.

Advantages

The present invention makes it possible to automatically generate setting information for a different model on the basis of settings previously made.

BRIEF DESCRIPTION OF THE DRAWINGS

FIG. 1(a) is an exemplary table showing constraint rules based on dependencies between setting values and applied to a printer. FIG. 1(b) is a table showing results obtained by applying the constraint rules.

FIG. 3 is a table showing an exemplary set of common setting items.

FIG. 4(a) illustrates an exemplary entry screen which allows scrolling. FIG. 4(b) illustrates an exemplary entry screen which allows switching between tabs. FIG. 4(c) illustrates an exemplary advanced setting screen.

FIG. 5 is an exemplary table showing common setting information.

FIG. 6 is an exemplary table showing application rules.

FIG. 7(a) is an exemplary table showing constraint rules based on dependencies between setting values and applied to a printer according to an embodiment of the present invention. FIG. 7(b) is a table showing results obtained by applying the constraint rules. FIG. 7(c) is a table showing a result obtained by applying the constraint rules according to a method of the present invention.

SUMMARY OF THE INVENTION

Figure 2A:
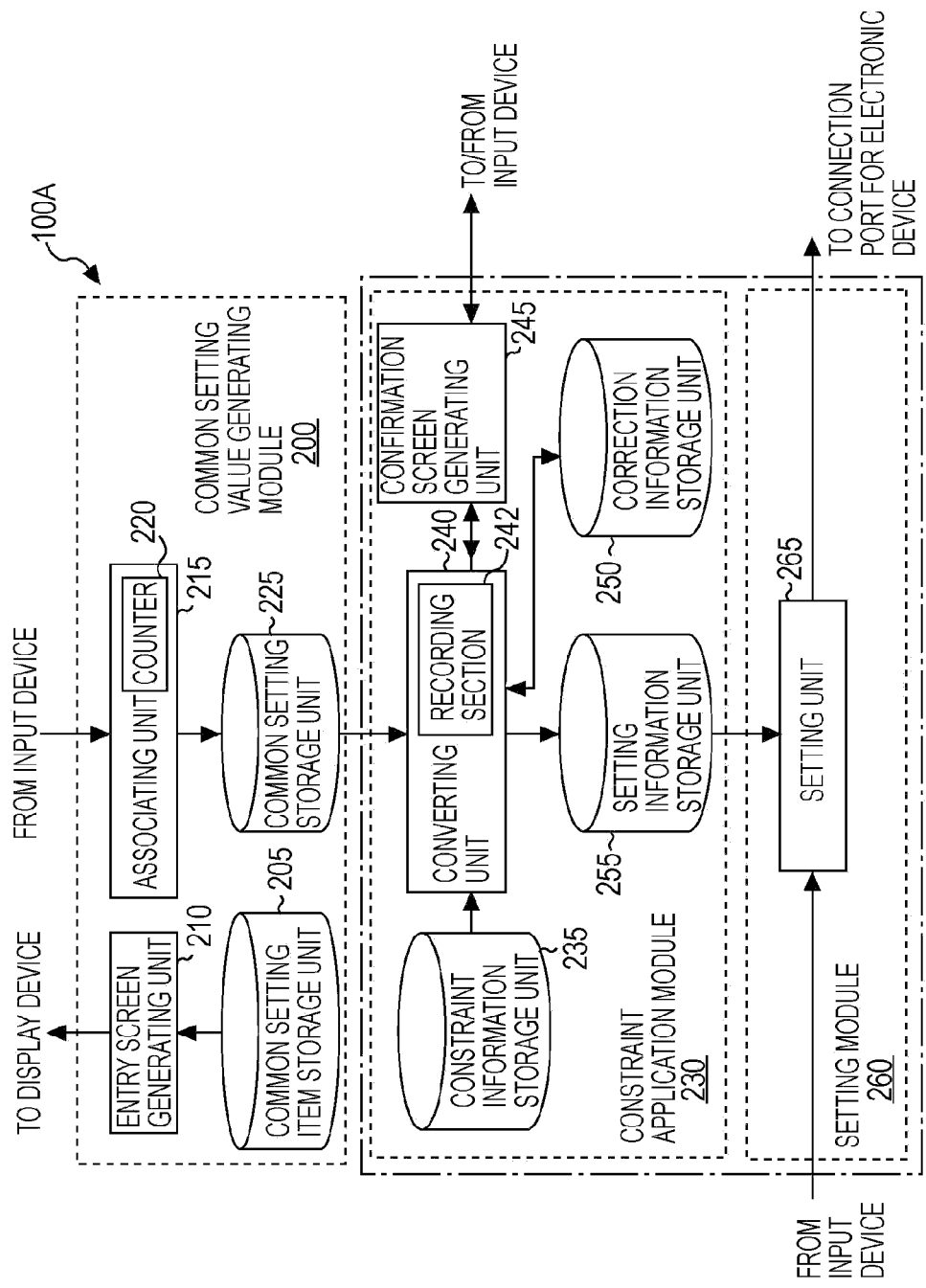
FIG. 2(a) is a functional block diagram illustrating the information processing apparatus 100A which executes a program for generating setting information according to an embodiment of the present invention.

Best Mode for Carrying Out the Invention

The best mode for carrying out the present invention will now be described in detail with reference to the drawings. Embodiments described below are not meant to limit the scope of the invention in the claims, and not all combinations of features described in the embodiments are essential to solving means of the invention. The same elements are given the same reference numerals throughout the description of the embodiments.

FIG. 2(a) is a functional block diagram illustrating an information processing apparatus 100A which executes a program for generating setting information according to an embodiment of the present invention. The information processing apparatus 100A of the present embodiment can connect to a plurality of models of electronic devices and make processing requests. A program for generating setting information includes a common setting value generating module 200, a constraint application module 230, and a setting module 260 and is executed by the information processing apparatus 100A. The constraint application module 230 and the setting module 260 may constitute a program that is separate from the common setting value generating module 200. For example, these two modules, the constraint application module 230 and the setting module 260, may be realized as modules of a driver included in an electronic device which, among the plurality of models of electronic devices, a user of the information processing apparatus 100A wishes to use.

The common setting value generating module 200 causes the information processing apparatus 100A to function as a common setting item storage unit 205, an entry screen generating unit 210, an associating unit 215, or a common setting storage unit 225. The constraint application module 230 causes the information processing apparatus 100A to function as a constraint information storage unit 235, a converting unit 240, a confirmation screen generating unit 245, a correction information storage unit 250, or a setting information storage unit 255. The setting module 260 causes the information processing apparatus 100A to function as a setting unit 265.

The common setting item storage unit 205 serving as a first storage device stores a set of common setting items (or a common setting item set) which is a collection of setting items of a plurality of electronic device models. Setting items for each model are available through manuals, catalog specifications, or standards for electronic devices. For example, for printers, a PostScript Printer Description (PPD) file defines typical setting items as standards for PostScript printers. FIG. 3 shows an exemplary common setting item set that is available for printers and is stored in the common setting item storage unit 205. As shown in FIG. 3, the common setting item set is a list of pairs, each pair including a setting item and selectable setting value options for the setting item.

The entry screen generating unit 210 refers to a set of common setting items read out of the common setting item storage unit 205 to generate an entry screen which enables the user of the information processing apparatus 100A to make settings. In the present embodiment, the entry screen generating unit 210 first divides the common setting items into priority items and non-priority items on the basis of the frequency of setting (or setting frequency). In other words, common setting items frequently selected are categorized as priority items and those less frequently selected are categorized as non-priority items.

A method for dividing common setting items into categories will now be concretely described with reference to FIG. 3. For example, some common setting items, such as paper size, scaling, aggregation, and duplex, are generally selected by many users. Therefore, these items are viewed as frequently selected setting items and thus are categorized as priority items. On the other hand, some other common setting items, such as staple, punch, image quality, economy, color/monochrome, left/right inversion, and black/white inversion, are not necessarily selected by many users. Therefore, these items are viewed as less frequently selected setting items and thus are categorized as non-priority items. Instead of or in addition to the setting frequency described above, the degree of effects on processing results or the level of detail of setting may be used to divide the common setting items into priority items and non-priority items.

Then, the entry screen generating unit 210 generates an entry screen such that common setting items categorized as priority items are displayed above those categorized as non-priority items. Examples of such an entry screen are illustrated in FIG. 4(a) to FIG. 4(c). The entry screen of FIG. 4(a) displays all common setting items on one screen in scroll mode. In this case, common setting items categorized as priority items are displayed in an upper part 400 of the screen, while those categorized as non-priority items are displayed in a lower part 410 of the screen. Instead of a vertically oriented scroll bar 405 of FIG. 4(a), a horizontally oriented scroll bar may be used. In this case, common setting items categorized as priority items are displayed on the left side of the screen.

The entry screen of FIG. 4(b) allows the user to select one of tabs, each tab containing a set of common setting items. Here, common setting items categorized as priority items are contained in a tab 420 which appears on top by default, while common setting items categorized as non-priority items are contained in tabs 430 other than the tab 420 appearing on top by default.

It is also possible that common setting items categorized as priority items are displayed on a main screen, while those categorized as non-priority items are displayed on a screen other than the main screen. For example, as illustrated in FIG. 4(c), common setting items categorized as non-priority items are displayed on a screen that opens by clicking an advanced setting button 415 of FIG. 4(a) or an advanced setting button 440 of FIG. 4(b). Alternatively, an entry screen may be generated by appropriately combining the methods described above. For example, priority items are displayed in a top tab, where some priority items with higher priority are displayed in an upper part of the top tab and those with lower priority are displayed in a lower part of the top tab.

The associating unit 215 associates each setting value entered by the user through an entry screen with its corresponding common setting item and the order in which the user entered the setting value, and stores them as common setting information in the common setting storage unit 225. For example, the associating unit 215 has a counter 220, which is first initialized to a value of one and incremented by one every time the associating unit 215 receives a setting value. A value of the counter 220 is used as the order in which a setting value was entered. FIG. 5 shows exemplary common setting information stored in the common setting storage unit 225 serving as a second storage device. The common setting information contains only setting items having corresponding setting values set by the user. If the user changes a setting value previously entered, the setting value only is changed while the order associated therewith remains unchanged from the order in which the setting value was initially entered.

The constraint information storage unit 235 serving as a third storage device stores at least one piece of constraint information that is dependent on the setting order of setting values and is applied to one of a plurality of models of electronic devices. Here, the constraint information that is dependent on the setting order of setting values and is applied to an electronic device is constraint information that restricts values that can be set for setting items of the electronic device. At the same time, the constraint information is information about a constraint that is applied on the basis of a relationship with a setting value that is set for another setting item. Typically, an electronic device has constraint information that is dependent on the setting order of setting values and varies depending on the model. A table of FIG. 1(a) shows an example of constraint information that is dependent on the setting order of setting values and is applied to printers. The constraint information storage unit 235 may further stores a set of setting items for the above-described one model and constraint information about ranges of setting values.

If it is not allowed to simultaneously set values for two setting items, the constraint information dependent on the setting order of setting values according to the present embodiment selects a setting item to be given priority according to application rules shown in the table of FIG. 6. If these two setting items for which it is not allowed to simultaneously set values are in different categories, that is, if one of these two setting items is a priority item and the other is a non-priority item, a setting item for which a value is set first (or earlier in time) is given priority (see 1 and 2 of FIG. 6).

This is because if a value for a priority item is set first (as shown in 1 of FIG. 6), a priority should be given to the priority item. As described above, common setting items categorized as priority items are displayed above those categorized as non-priority items in an entry screen. Therefore, if a value for a non-priority item is set earlier in time than a value for a priority item (as shown in 2 of FIG. 6), it can be presumed that the user is highly motivated to set a value for the non-priority item. Thus, a priority is given to the non-priority item.

On the other hand, if two setting items for which it is not allowed to simultaneously set values are in the same category, that is, if these two setting items are both categorized as priority items or non-priority items, a setting item for which a value is set second (or later in time) is given priority (see 3 and 4 of FIG. 6). This is because when the two setting items have the same level of priority, it seems reasonable to enable a setting value that has been set most recently, just like in the case where, when the same setting was changed many times, a setting value that has been updated most recently is enabled.

FIG. 7(a) shows an example of constraint information that is dependent on the setting order of setting values and follows application rules such as those described above. In FIG. 7(a), "staple" and "punch" are items categorized as non-priority items, while "2 in 1" and "duplex" are items categorized as priority items. Additionally, "staple" and "punch", "staple" and "duplex", "staple" and "2 in 1", and "punch" and "2 in 1" are pairs for each of which it is not allowed to simultaneously set respective values. For example, if a value for "punch" is set after a value for "staple" is set, priority is given to the value for "punch" that is set later in time and "staple" is cancelled (or set to OFF), because "staple" and "punch" are setting items in the same category. Even if it is attempted to set a value for "staple" after a value for "duplex" is set, the setting of "staple" is rejected because "duplex" and "staple" differ in category.

If the constraint information storage unit 235 is part of the constraint application module 230 as in the case of the present embodiment, updating of constraint information is performed as updating of the constraint application module 230. On the other hand, if the constraint information storage unit 235 is provided separately from the constraint application module 230, constraint information to be applied to each model is downloaded from a server on a network as necessary by the user of the information processing apparatus 100A. If the constraint application module 230 is realized as a driver of an electronic device, the constraint information storage unit 235 stores constraint information applied to the electronic device.

To generate setting information for one of a plurality of models of electronic device, the converting unit 240 reads setting values from the common setting storage unit 225 in order in which the user set these values, refers to constraint information that is dependent on the setting order of setting values and is to be applied to the one model, and converts each of the read setting values to a setting value to be set for the one model.

More specifically, if it is not allowed by constraint information dependent on the setting order of setting values to simultaneously set a first setting value read from the common setting storage unit 225 in order in which it was set by the user and a second setting value that is to be set for the one model and is obtained by converting a setting value read before the first setting value was read, the converting unit 240 changes one of the first and second setting values so as not to be set. Additionally, when one of the first and second setting values is changed, the converting unit 240 records information about the change in a recording section 242 of the converting unit 240.

Processing performed by the converting unit 240 will be concretely described using constraint rules (shown in FIG. 7(a)) applied to a printer of Model X. Common setting information stored in the common setting storage unit 225 is as follows: 1. punch=ON, 2. 2 in 1=ON, and 3. duplex=ON. That is, values for the setting items "punch", "2 in 1", and "duplex" in the set of common setting items are set to ON in this order by the user. As shown in FIG. 7(b), there are two possible results obtained by applying the constraint rules to this common setting information. To obtain a single result, the setting order in which the user set these values is used in the present invention. First, the converting unit 240 initializes the setting values to be set for the Model X to OFF (see the second column of FIG. 7(c)). Then, the converting unit 240 extracts, from the common setting storage unit 225, "punch=ON" that was set first and determines this to be a setting for the Model X (see the third column of FIG. 7(c)).

Next, the converting unit 240 extracts, from the common setting storage unit 225, "2 in 1=ON" that was set second, changes this to "2 in 1=OFF" with reference to the constraint rules for the Model X, and determines "2 in 1=OFF" to be a setting for the Model X (see the fourth column of FIG. 7(c)). Subsequently, the converting unit 240 extracts, from the common setting storage unit 225, "duplex=ON" that was set third and determines this to be a setting for the Model X with reference to the constraint rules for the Model X (see the fifth column of FIG. 7(c)). As a result, a set of setting values, that is, 1. staple=OFF, 2. punch=ON, 3. 2 in 1=OFF, and 4. duplex=ON for the Model X is determined (see the sixth column of FIG. 7(c)).

Figure 8:
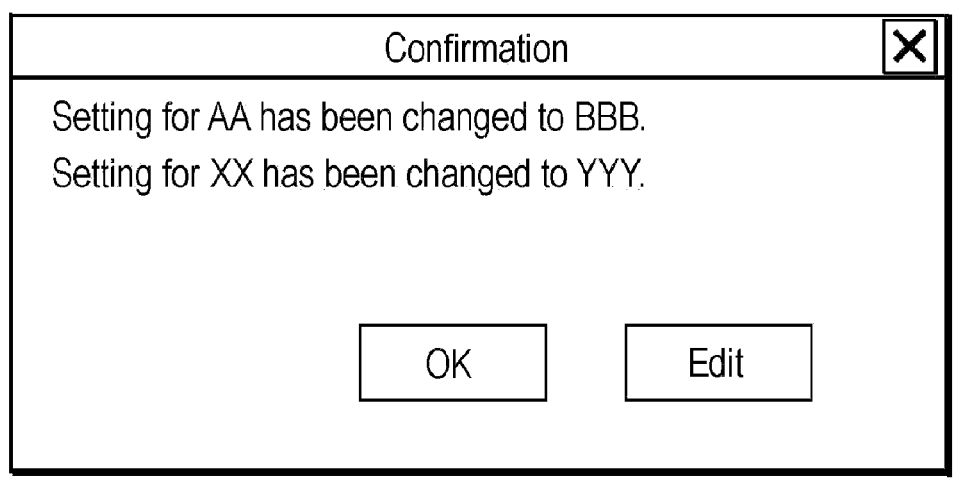
FIG. 8 illustrates an exemplary confirmation screen.

The confirmation screen generating unit 245 receives, from the converting unit 240, information about changes recorded in the recording section 242 and generates a confirmation screen which enables the user to confirm the changes. FIG. 8 illustrates an exemplary confirmation screen. As shown, the confirmation screen displays the names of setting items for which setting values have been changed and the setting values after the changes. The confirmation screen may further display setting values before the changes. When information indicating that such displayed changes have been confirmed is received from the user through the confirmation screen, the confirmation screen generating unit 245 informs the converting unit 240 of the receipt of the information. Then, the converting unit 240 stores in the setting information storage unit 255 the determined set of setting values to be set for the one model.

On the other hand, if information indicating that some corrections are to be made is received from the user through the confirmation screen, the confirmation screen generating unit 245 further generates a correction screen which allows corrections to be made. For example, a correction screen may display common setting information such as that shown in FIG. 5 in such a way that the user can change the setting order, or can change or delete setting values.

Upon receipt of correction information from the user through the correction screen, the confirmation screen generating unit 245 passes the received correction information to the converting unit 240. On the basis of common setting information corrected using the correction information, the converting unit 240 determines a set of setting values for the above-described one model again in the same method as that described above. At the same time, the converting unit 240 stores the corrected common setting information in the correction information storage unit 250. When generating setting values to be set for another model next time, the converting unit 240 uses this corrected common setting information as an alternative of information stored in the common setting storage unit 225. Then, the set of setting values determined for the above-described one model after the correction is confirmed through the operation of the confirmation screen generating unit 245 by the user again, and is stored by the converting unit 240 in the setting information storage unit 255.

In response to an instruction from the user to use an electronic device of the above-described one model, the setting unit 265 reads from the setting information storage unit 255 a set of setting values to be set for the above-described one model and transmits the set of setting values to the electronic device of the above-described one model. For example, the setting information storage unit 255 associates a set of setting values to be set for the above-described one model with a file to which this setting is applied and stores them. In this case, when the user specifies this file to give an instruction to use the electronic device of the above-described one model, the setting unit 265 reads from the setting information storage unit 255 the set of setting values to be set for the above-described one model and transmits the set of setting values to the electronic device of the above-described one model.

In the information processing apparatus 100A of the present embodiment described above, the user can initially make settings for a set of common setting items which is a collection of setting items of a plurality of electronic device models. Therefore, even if a current model of electronic device used is changed to a new model with higher performance, it will not occur that settings for the new model cannot be automatically generated using settings for the current model due to the presence of setting items that are not provided in the current model. Additionally, constraint information dependent on the setting order of setting items for one model of electronic device is applied using the setting order in which the user made settings for the set of common setting items. Therefore, it is possible to determine a single set of setting values for one model.

Moreover, an entry screen which enables the user to make settings for a set of common setting items displays common setting items that are categorized as priority items on the basis of the frequency of setting, above those categorized as non-priority items. Therefore, the setting order in which the user entered setting values from the entry screen can be viewed as a setting priority determined by the user. Additionally, for two setting items which are not allowed to be simultaneously set, constraint information dependent on the setting order of setting values according to the present embodiment can determine which of the two setting items having been set first and second is to be given priority, depending on whether the two setting items are in the same category or not.

Thus, a set of setting values for one model can be determined from (i) setting order in which the user entered setting values from the entry screen and which can be viewed as a setting priority determined by the user and (ii) constraint information that is dependent on the setting order of setting values and that selects which of two setting items which are not allowed to be simultaneously set is to be given priority on the basis of whether these two setting items are in the same category. Therefore, with the information processing apparatus 100A of the present embodiment, a set of setting values that is to be set for one model and that meets the user's intention can be determined.

Figure 9:
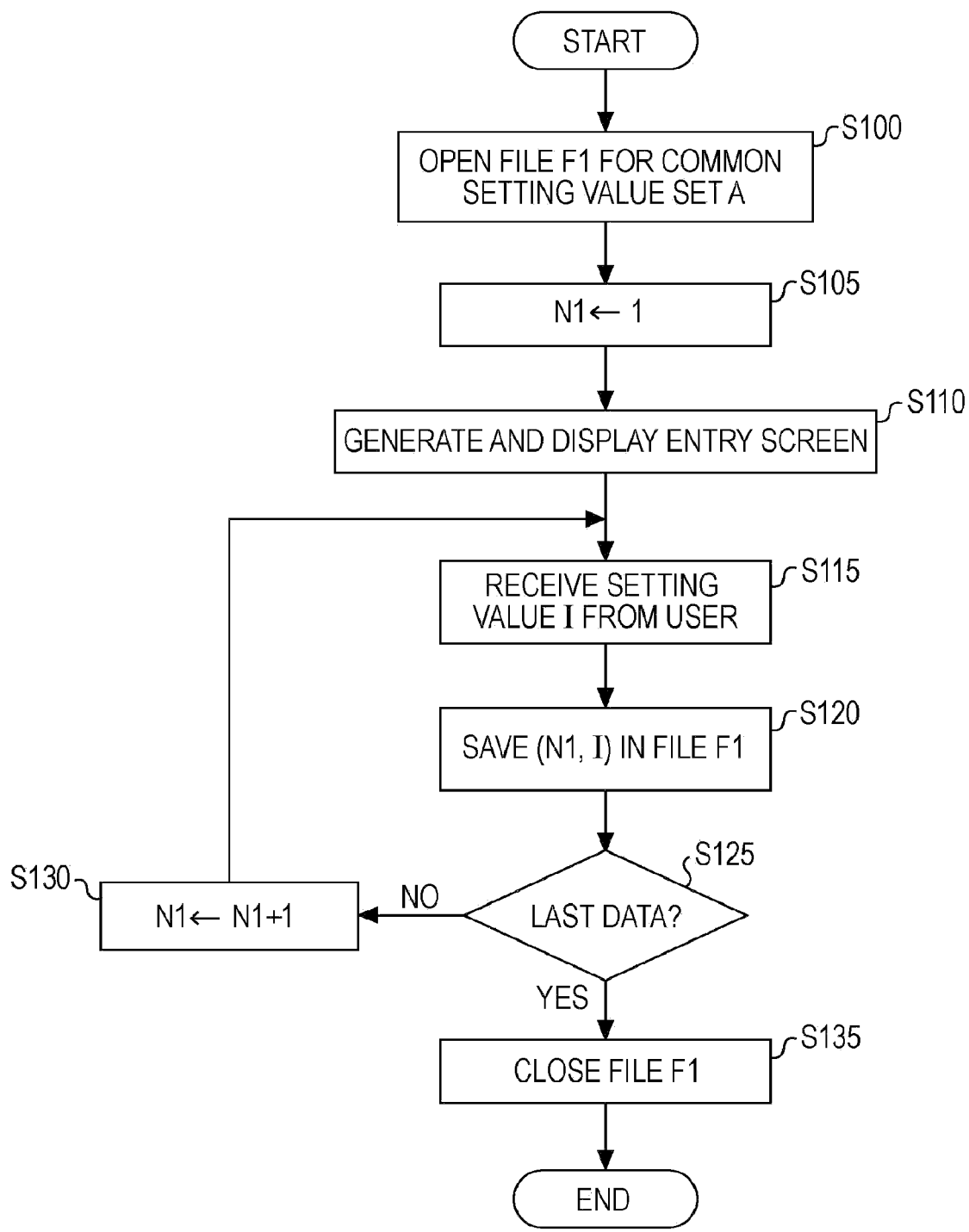
FIG. 9 is a flowchart showing an exemplary flow of processing performed by the common setting value generating module 200.

Next, the operation of each part of the information processing apparatus 100A according to the present embodiment will be described with reference to flowcharts of FIG. 9 to FIG. 14. FIG. 9 shows an exemplary flow of processing performed by the information processing apparatus 100A which functions as the common setting item storage unit 205, entry screen generating unit 210, associating unit 215, or common setting storage unit 225 under the control of the common setting value generating module 200.

At the start of processing, the associating unit 215 opens an empty file F1 for a common setting value set A, that is, common setting information to be stored in the common setting storage unit 225 (step S100) and initializes a value N1 of the counter 220 to one (step S105). Next, the entry screen generating unit 210 refers to a set of common setting items stored in the common setting item storage unit 205, generates an entry screen which enables the user to make settings for the set of common setting items, and causes a display device 125 (see FIG. 15) of the information processing apparatus 100A to display the generated entry screen (step S110). In response to a user input to the entry screen through an input device, such as a keyboard, the associating unit 215 receives a setting value I from the input device (step S115), associates the setting value I with the value N1 of the counter 220, and stores them in the file F1 (step S120). Here, the setting value I is a combination of a setting item and its setting value.

Next, the associating unit 215 determines whether the received setting value I is the last data. In other words, the associating unit 215 determines whether an input indicating the completion of date entry has been received from the user (step S125). If such an input has not been received from the user (NO in step S125), the associating unit 215 increments the value N1 of the counter 220 by one (step S130). Then, the processing returns to step S115 from which the series of processing described above is performed again. On the other hand, if an input indicating the completion of date entry has been received from the user (YES in step S125), the associating unit 215 closes the file F1 (step S135) and the processing ends.

FIG. 10 to FIG. 13 each show an exemplary flow of processing performed by the information processing apparatus 100A which functions as the constraint information storage unit 235, confirmation screen generating unit 245, correction information storage unit 250, or setting information storage unit 255 under the control of the constraint application module 230.

Figure 10:
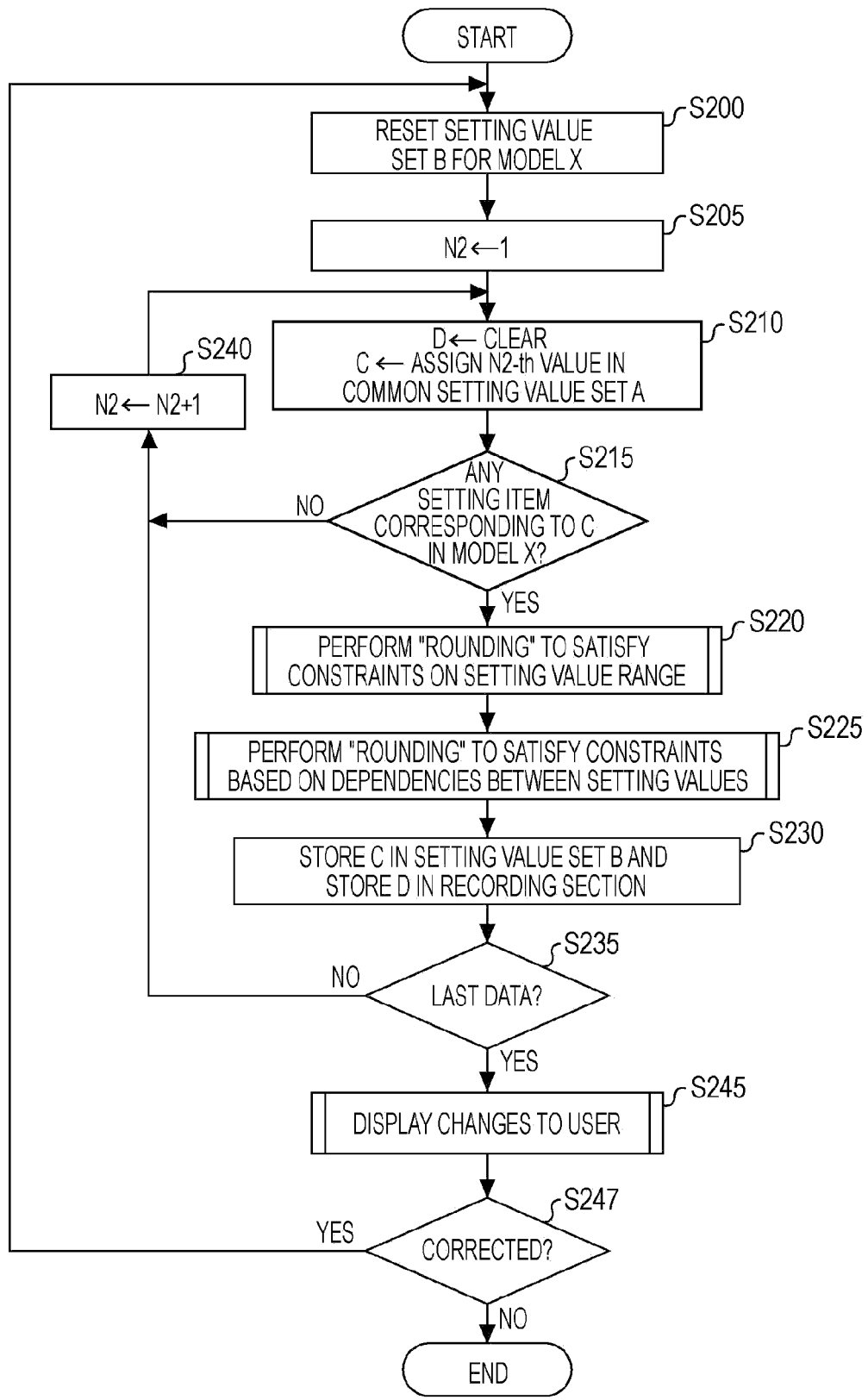
FIG. 10 is a flowchart showing an exemplary flow of processing performed by the constraint application module 230.

Referring to FIG. 10, at the start of processing, the converting unit 240 resets a setting value set B for the Model X to be stored in the setting information storage unit 255 (step S200) and initializes a value N2 of a counter to one (step S205). Next, the converting unit 240 clears a value of information D indicating changes made to the common setting value set A created by the user and assigns the N2-th value of the common setting value set A read out of the common setting storage unit 225 to a variable C (step S210). Then, on the basis of a set of setting items for the Model X stored in the constraint information storage unit 235, the converting unit 240 determines whether a setting item corresponding to the variable C exists in the Model X (step S215). In the present embodiment, the constraint information storage unit 235 stores constraint information about constraints on ranges of setting values as well as a set of setting items for the Model X.

If there is a setting item corresponding to the variable C (YES in step S215), the converting unit 240 first performs "rounding" on a setting value of the variable C to satisfy constraints on ranges of setting values (step S220). This will be described in detail below with reference to FIG. 11. Next, the converting unit 240 performs "rounding" on the setting value of the variable C to satisfy constraints based on dependencies between setting values (step S225). This will be described in detail below with reference to FIG. 12. Then, the converting unit 240 stores the variable C in the setting value set B and stores the information D in the recording section 242 (step S230). Next, the converting unit 240 determines whether the current variable C is the last data. In other words, the converting unit 240 determines whether no data remains in the common setting value set A (step S235).

If the current variable C is not the last data (NO in step S235) or if "NO" in step S215, that is, no setting item corresponding to the variable C exists in the Model X, the converting unit 240 increments the value N2 of the counter by one (step S240). Then, the processing returns to step S210 from which the series of processing described above is performed again. On the other hand, if "YES" in step S235, that is, if the current variable C is the last data in the common setting value set A, the converting unit 240 passes, to the confirmation screen generating unit 245, change information indicating changes and recorded in the recording section 242. Then, the confirmation screen generating unit 245 uses the received change information to generate a confirmation screen and causes the display device 125 of the information processing apparatus 100A to display the generated confirmation screen (step S245). Processing involved in generating and displaying the confirmation screen will be described in detail below with reference to FIG. 13.

Next, the converting unit 240 receives, from the confirmation screen generating unit 245, correction information about corrections made by the user and determines whether there are any corrections made by the user (step S247). If there are any corrections (YES in step S247), the converting unit 240 corrects, for example, the common setting information, that is, the common setting value set A on the basis of the correction information. Then, the processing returns to step S200 from which the series of processing described above is performed again using the corrected common setting value set A. If there is no correction (NO in step S247), the processing ends.

Figure 11:
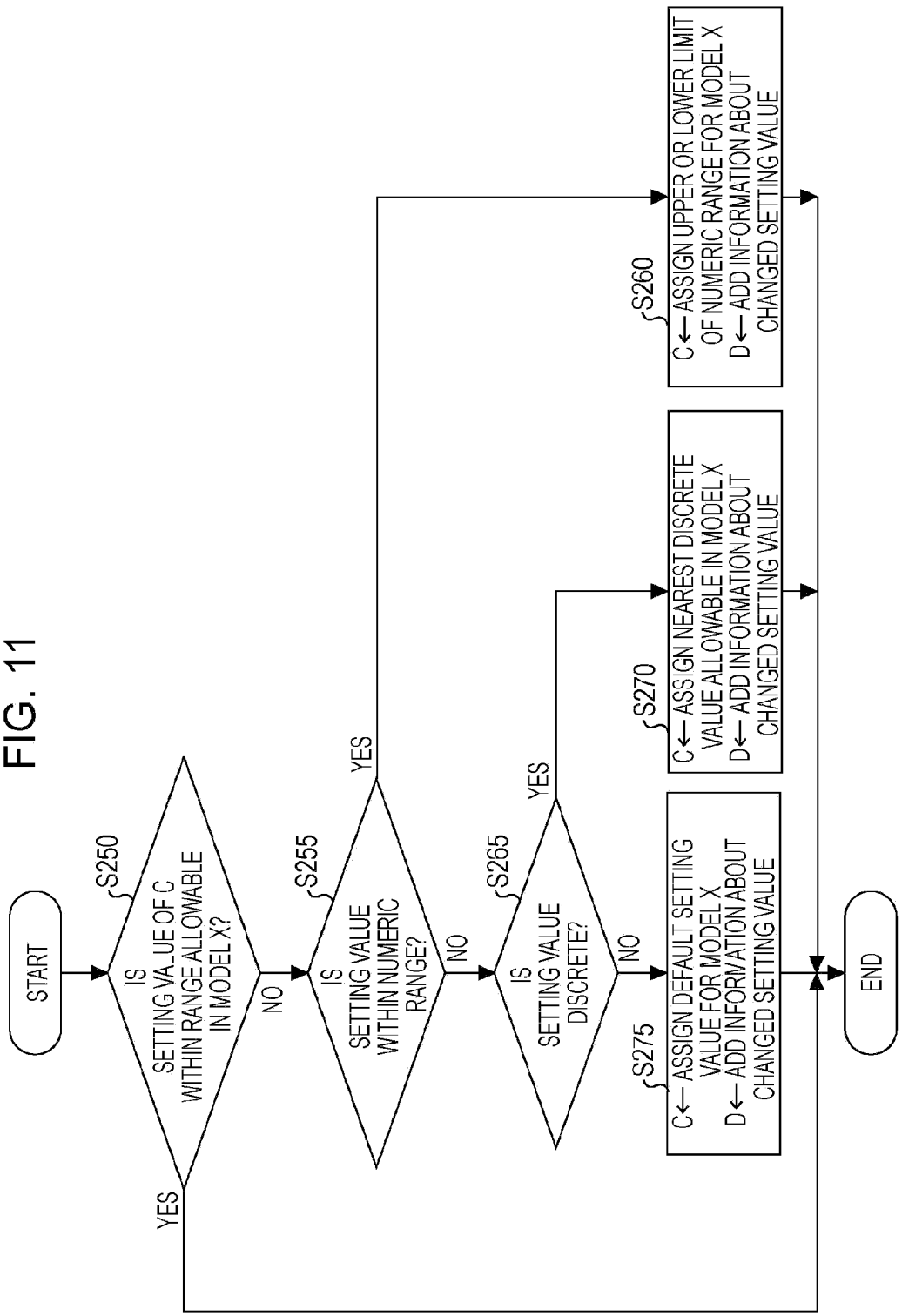
FIG. 11 is a flowchart showing an exemplary flow of another processing performed by the constraint application module 230.

Referring to FIG. 11, there will now be given a detailed description of "rounding" performed by the converting unit 240 to satisfy constraints on ranges of setting values. The converting unit 240 first reads, from the constraint information storage unit 235, constraint information about constraints on ranges of setting values for the Model X and determines whether a setting value of the variable C is within an allowable range for the Model X (step S250). If the setting value of the variable C is not within the allowable range (NO in step S250), the converting unit 240 determines whether the setting value of the variable C is within a numeric range (step S255). Examples of the case where a setting value is within a numeric range include a case where a setting item corresponding to the variable C is a margin size.

If the setting value of the variable C is within a numeric range (YES in step S255), the converting unit 240 assigns an upper or lower limit of the numeric range for the Model X to the variable C. That is, the converting unit 240 assigns an upper limit of the numeric range for the Model X to the variable C if the setting value of the variable C exceeds the upper limit, and assigns a lower limit of the numeric range for the Model X to the variable C if the setting value of the variable C is below the lower limit. At the same time, the converting unit 240 adds information about the changed setting value to the information D indicating changes (step S260).

If the setting value of the variable C is not within a numeric range (NO in step S255), the converting unit 240 determines whether the setting value of the variable C is a discrete value (step S265). Examples of the case where a setting value is a discrete value include a case where a setting item corresponding to the variable C is a paper size. If the setting value of the variable C is a discrete value (YES in step S265), the converting unit 240 assigns the nearest discrete value allowable in the Model X to the variable C. At the same time, the converting unit 240 adds information about the changed setting value to the information D indicating changes (step S270).

If the setting value of the variable C is not a discrete value (NO in step S265), the converting unit 240 assigns a default value of the setting value for the Model X to the variable C. At the same time, the converting unit 240 adds information about the changed setting value to the information D indicating changes (step S275). Then, the processing ends.

Figure 12:
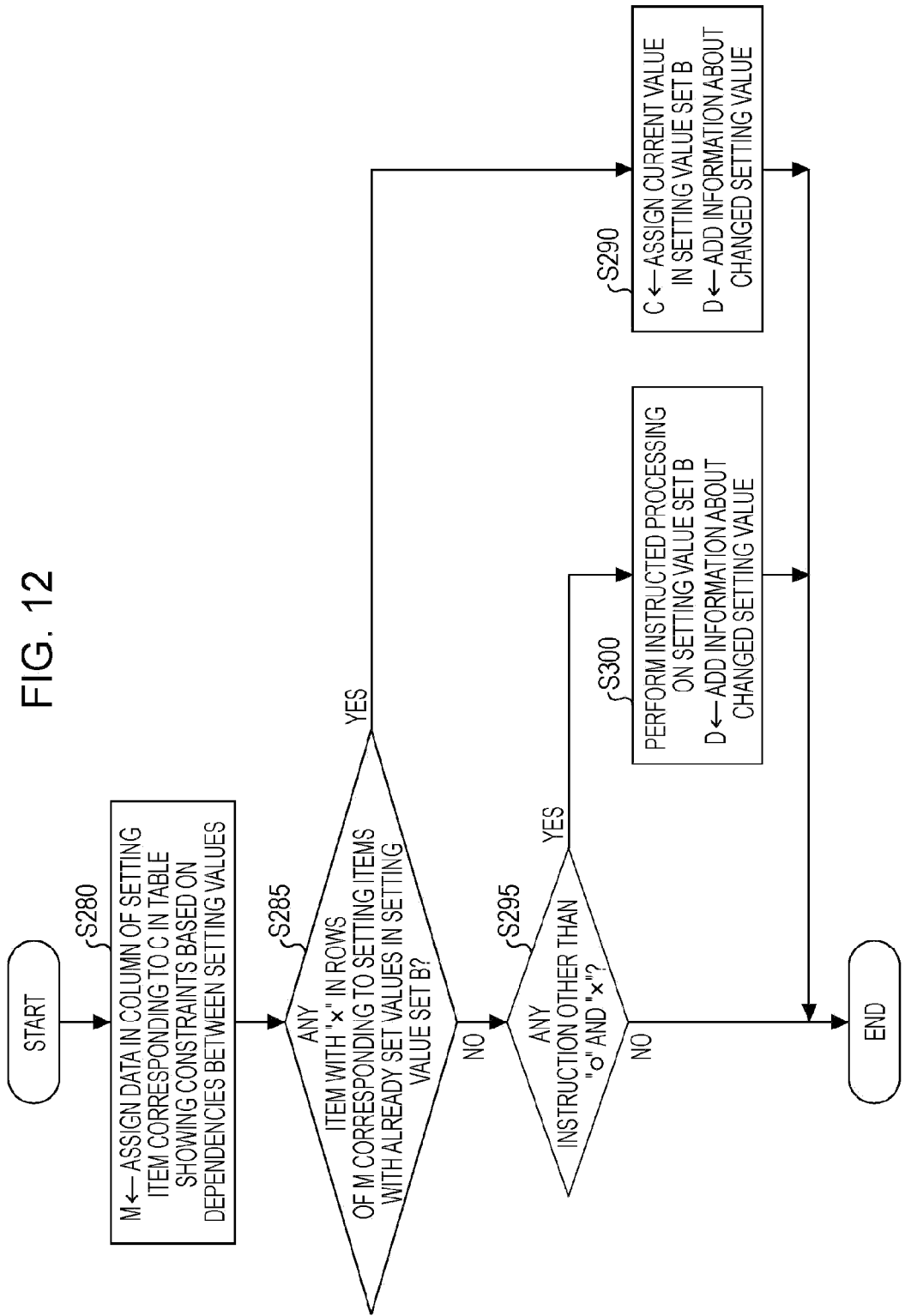
FIG. 12 is a flowchart showing an exemplary flow of another processing performed by the constraint application module 230.

Referring to FIG. 12, there will now be given a detailed description of "rounding" performed by the converting unit 240 to satisfy constraints based on dependencies between setting values. The converting unit 240 first reads, from the constraint information storage unit 235, constraint information about constraints based on dependencies between setting values for the Model X. Then, the converting unit 240 assigns, to a variable M, data in a column of a setting item corresponding to the variable C in the table (see FIG. 7(a)) showing constraints based on dependencies between setting values (step S280). Next, the converting unit 240 refers to rows of the variable M corresponding to setting items with already set values in the setting value set B and determines whether there is any item with "X" mark (step S285).

If there is any item with "X" mark (YES in step S285), the converting unit 240 assigns, to the variable C, a current setting value of the setting item corresponding to the variable C in the setting value set B. At the same time, the converting unit 240 adds information about the changed setting value to the information D indicating changes (step S290). Then, the processing ends. If there is no item with "X" mark (NO in step S285), the converting unit 240 refers to the rows of the variable M corresponding to the setting items with already set values in the setting value set B and determines whether there is any instruction other than "O" and "X" marks (step S295).

If there is no instruction other than "O" and "X" marks (NO in step S295), the processing ends. If there is any instruction other than "O" and "X" marks (YES in step S295), the converting unit 240 performs the instructed processing on a setting value of the setting item provided with the instruction other than "O" and "X" marks in the setting value set B. At the same time, the converting unit 240 adds information about the changed setting value to the information D indicating changes (step S300). Then, the processing ends.

Figure 13:
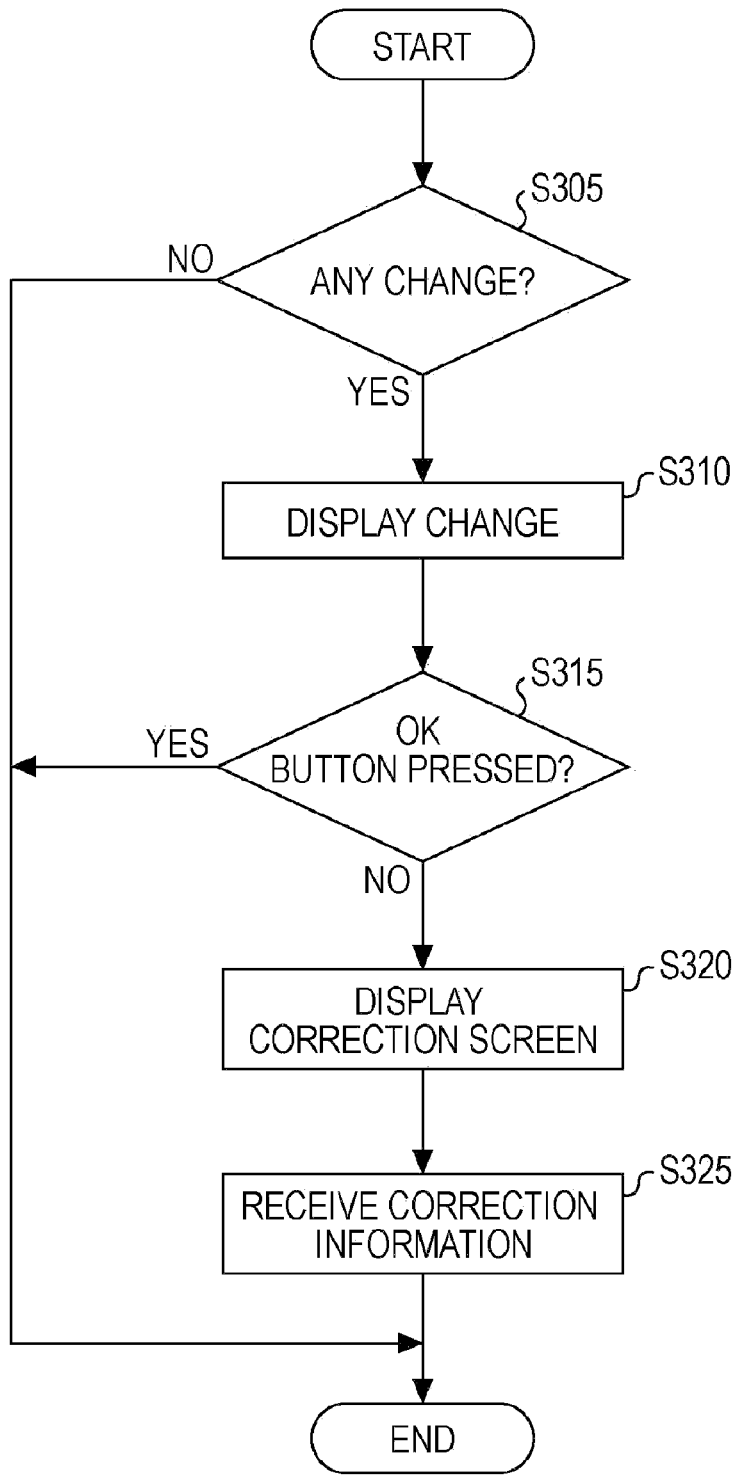
FIG. 13 is a flowchart showing an exemplary flow of another processing performed by the constraint application module 230.

Referring to FIG. 13, processing performed by the confirmation screen generating unit 245 to generate and display a confirmation screen will be described. The confirmation screen generating unit 245 receives from the converting unit 240 information about changes recorded in the recording section 242 and determines whether there are any changes (step S305). If there are any changes (YES in step S305), the confirmation screen generating unit 245 generates a confirmation screen (see FIG. 8) for the user to confirm the changes and causes the display device 125 of the information processing apparatus 100A to display the generated confirmation screen (step S310). Next, the confirmation screen generating unit 245 determines whether the user has pressed an OK button (step S315). If the OK button has been pressed (YES in step S315), the processing ends.

If the OK button has not been pressed, that is, if an edit button has been pressed (NO in step S315), the confirmation screen generating unit 245 further generates a correction screen for correction and causes the display device 125 of the information processing apparatus 100A to display the generated correction screen (step S320). Then, the confirmation screen generating unit 245 receives correction information from the user through the correction screen (step S325). The processing thus ends.

Figure 14:
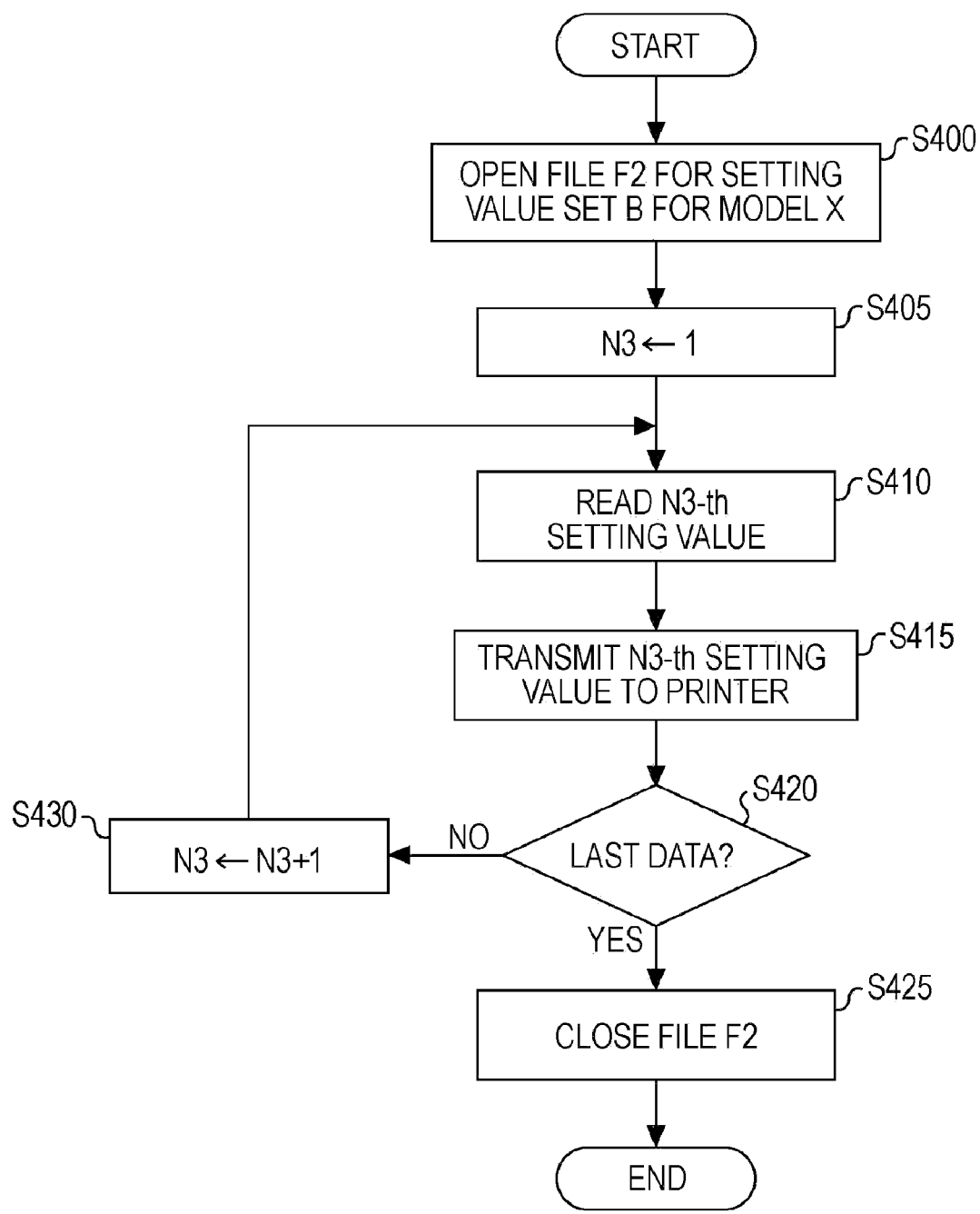
FIG. 14 is a flowchart showing an exemplary flow of processing performed by the setting module 260.

FIG. 14 shows an exemplary flow of processing performed by the information processing apparatus 100A which functions as the setting unit 265 under the control of the setting module 260. At the start of processing, the setting unit 265 opens a file F2 for the setting value set B that is read from the setting information storage unit 255 and is to be set for the Model X (step S400) and initializes a value N3 of a counter to one (step S405). Next, the setting unit 265 reads the N3-th setting value in the file F2 (step S410) and transmits the read setting value to a printer (step S415). Then, the setting unit 265 determines whether the read setting value is the last data (step S420).

If the read setting value is not the last data (NO in step S420), the setting unit 265 increments the value N3 of the counter by one (step S425) and the processing returns to step S410. If the read setting value is the last data (YES in step S420), the setting unit 265 closes the file F2 (step S430) and the processing ends.

Figure 2B:
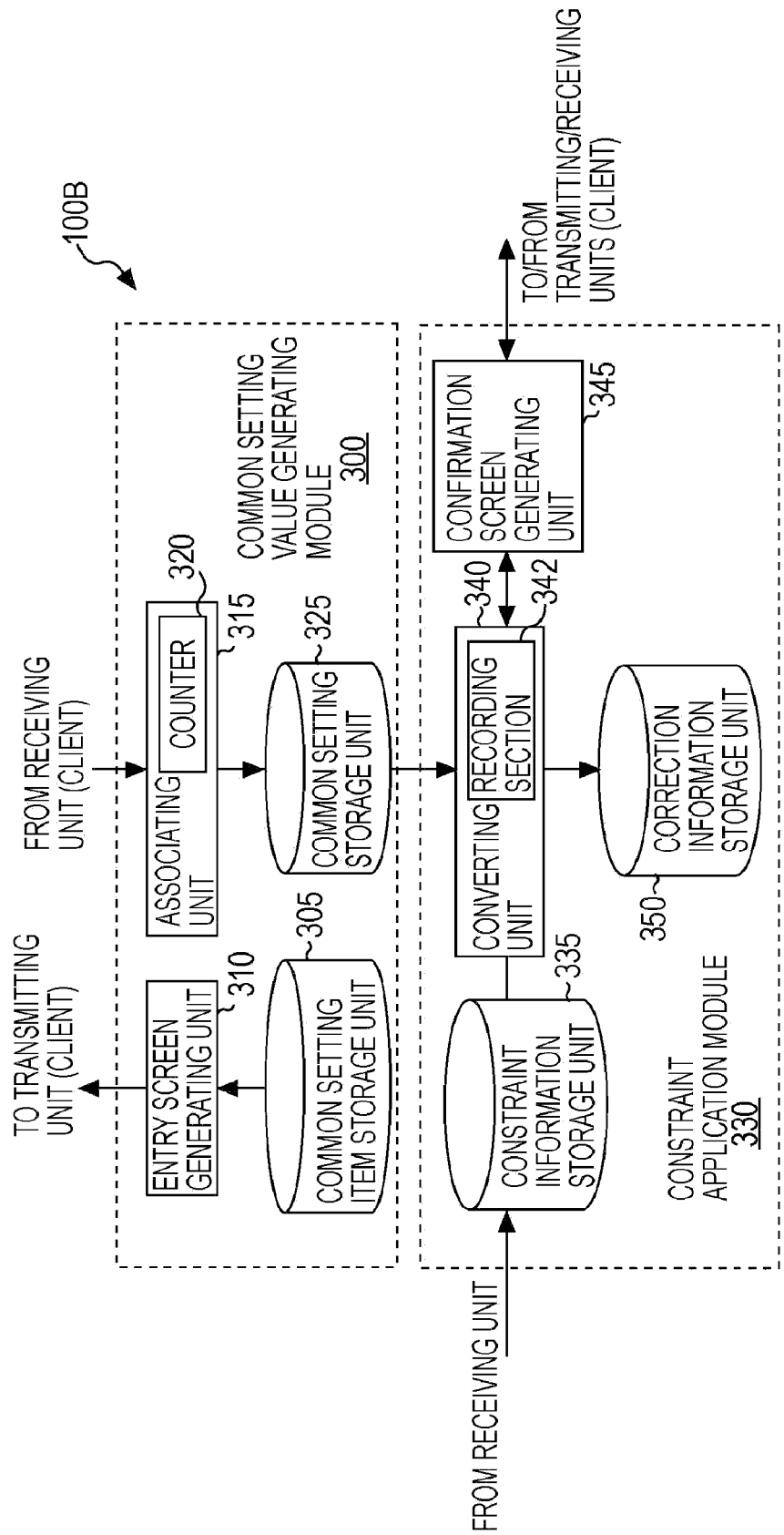
FIG. 2(b) is a functional block diagram illustrating the information processing apparatus 100B which executes a program for generating setting information according to another embodiment of the present invention.

Another embodiment of the present invention will now be described with reference to FIG. 2(b). FIG. 2(b) is a functional block diagram illustrating an information processing apparatus 100B which executes a program for generating setting information. The information processing apparatus 100B of the present embodiment is a server connected via a network to a client that can connect to a plurality of models of electronic devices and make processing requests. The program for generating setting information executed by the information processing apparatus 100B includes a common setting value generating module 300 and a constraint application module 330.

The common setting value generating module 300 causes the information processing apparatus 100B to function as a common setting item storage unit 305, an entry screen generating unit 310, an associating unit 315, or a common setting storage unit 325. The constraint application module 330 causes the information processing apparatus 100B to function as a constraint information storage unit 335, a converting unit 340, a confirmation screen generating unit 345, or a correction information storage unit 350.

The operations of the above-described parts will not be described here as they are basically the same as those described with reference to FIG. 2(a) and FIGS. 3 to 12. However, there are some differences in that data from the entry screen generating unit 310 is output to a transmitting unit of the information processing apparatus 100B (and to a client) and also in that data received by the associating unit 315 is input from a receiving unit of the information processing apparatus 100B (and from the client). In other words, in response to receipt from the client of a request for generating common setting information, the server starts processing in the common setting value generating module 300 and functions as the common setting item storage unit 305, entry screen generating unit 310, associating unit 315, or as common setting storage unit 325.

Additionally, in response to receipt from the client of a conversion request specifying a model of electronic device to be used, the server starts processing in the constraint application module 330 and functions as the constraint information storage unit 335, converting unit 340, confirmation screen generating unit 345, or correction information storage unit 350. The constraint information storage unit 335 stores a plurality of pieces of constraint information that are dependent on the setting order of setting values and are applied to different models of electronic devices. The plurality of pieces of constraint information are, for example, downloaded as necessary by an administrator of the server from a predetermined server on the network.

In response to a notification from the confirmation screen generating unit 345 that user's confirmation has been received, the converting unit 340 passes to the confirmation screen generating unit 345 a set of setting values to be set for the model of electronic device specified by the client. The confirmation screen generating unit 345 transmits the set of setting values through the transmitting unit to the client. In this case, the setting module 260 of FIG. 2(a) is installed in the client.

Figure 15:
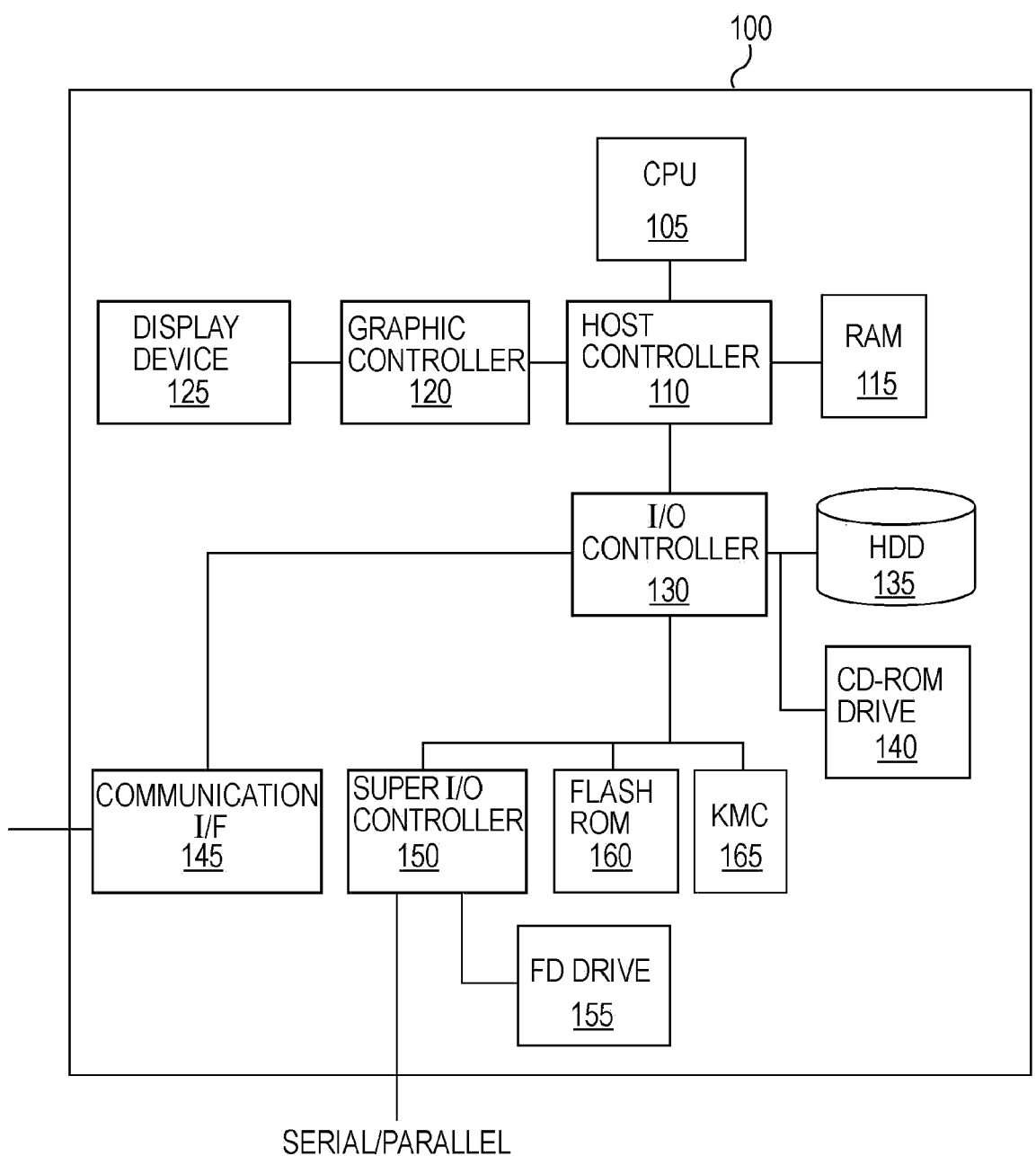
FIG. 15 illustrates an exemplary hardware configuration of the information processing apparatus 100 according to an embodiment of the present invention.

FIG. 15 illustrates an exemplary hardware configuration of an information processing apparatus that can be used in the two embodiments of the present invention described above. An information processing apparatus 100 includes a central processing unit (CPU) peripheral section, an input/output (I/O) section, and a legacy I/O section. The CPU peripheral section includes a CPU 105, a random-access memory (RAM) 115, a graphic controller 120, a display device 125, and an external display device which are connected to each other by a host controller 110. The I/O section includes a communication interface 145, a hard disk drive 135, and a compact disk read-only memory (CD-ROM) drive 140 which are connected to the host controller 110 by an I/O controller 130. The legacy I/O section includes a super I/O controller 150 connected to the input/output controller 130, a flexible disk (FD) drive 155 connected to the super I/O controller 150, a flash read-only memory (ROM) 160, and a keyboard/mouse controller (KMC) 165.

The host controller 1 connects the RAM 115 to the CPU 105 and the graphic controller 120 which access the RAM 115 at a high transmission rate. The CPU 105 operates on the basis of programs stored in the flash ROM 160 and the RAM 115 to control each part. The graphic controller 120 obtains image data generated by the CPU 105 or the like in a frame buffer in the RAM 115 and causes the display device 125 and/or the external display device to display the obtained image data. Alternatively, the graphic controller 120 may include a frame buffer in which image data generated by the CPU 105 or the like is to be stored.

The I/O controller 130 connects the host controller 1 to the communication interface 145, hard disk drive 135, and CD-ROM drive 140 which are relatively high-speed input/output devices. The communication interface 145 is connected to external devices via a network. The communication interface 145 may be an Ethernet (registered trademark) adapter connected to Ethernet, or a wireless local area network (LAN) adapter which allows wireless connection to the network without a cable.

The hard disk drive 135 stores a program and data used by the information processing apparatus 100. The CD-ROM drive 140 reads a program or data from a CD-ROM and supplies the read program or data to the RAM 115 or hard disk drive 135.

Relatively low-speed input/output devices, such as the super I/O controller 150 and the keyboard/mouse controller 165, and the flash ROM 160 are connected to the I/O controller 130. The flash ROM 160 stores, for example, a boot program executed by the CPU 105 when the information processing apparatus 100 is started and a program dependent on the hardware of the information processing apparatus 100. The FD drive 155 reads a program or data from a flexible disk and supplies the read program or data to the super I/O controller 150 via the RAM 115. The super I/O controller 150 is connected to input/output devices, such as a printer, flexible disk, keyboard, and mouse, via a serial port, parallel port, keyboard, mouse port, and the like.

A program for generating setting information according to the present invention described above is stored in a recording medium, such as a flexible disk, CD-ROM, IC card, or the like and provided by the user. The program is read out of such a recording medium via the I/O controller 130 and/or super I/O controller 150, installed in the information processing apparatus 100, and executed.

The program may be stored in an external storage medium. Examples of such an external storage medium include, as well as a flexible disk and a CD-ROM, an optical recording medium such as a digital versatile disk (DVD) or a phase-change disk (PD), a magneto-optical recording medium such as a magnetic disk (MD), a tape medium, and a semiconductor memory such as an IC card. Alternatively, a storage device, such as a hard disk or RAM, in a server system connected to a private communication network or the Internet may be used as a recording medium to provide the program to the information processing apparatus 100 via such a network.

Although the present invention has been described using the embodiments described above, the technical scope of the present invention is not limited to the scope of the embodiments. For example, according to the description above, the constraint application module 230 is configured to operate in an information processing apparatus that can connect to a plurality of electronic devices and make processing requests, or in a server connected to such an information processing apparatus via a network. However, the constraint application module 230 may be configured to operate directly on an electronic device. In this case, common setting information read out of the common setting storage unit 225 is transmitted from the information processing apparatus to the electronic device in response to an instruction from the user who wishes to use the electronic device. It will be obvious to those skilled in the art that various modifications and improvements can be made to the embodiments described above. It will be understood that such modified or improved embodiments are also within the technical scope of the present invention.

The invention claimed is:

1. An information setting method for a plurality of electronic devices, comprising:

a generating step of referring to a set of common setting items which is a collection of setting items of a plurality of electronic device models, and generating an entry screen which enables a user who wishes to use one of the plurality of electronic devices to make settings for the set of common setting items, wherein the user displays high priority common setting items on a main screen, and the user displays low-priority common setting items on a second screen;

a receiving step of receiving a plurality of setting values entered from the entry screen by the user;

a storage step of associating each of the received setting values with a corresponding common setting item and with the order in which the user entered the one of the plurality of setting values, and storing the resulting information in a common setting storage unit, wherein the user changes one of the set of common setting items while maintaining the order in which the user entered one of the plurality of setting values;

a prioritizing step of giving priority to setting one of the low-priority common setting items over one of the high priority common setting items if an initial value is set for the one of the low-priority common setting items earlier in time than the initial value for the one of the high priority common setting items; and a further prioritizing step of giving priority to a first common setting item over a second common setting item if the first common setting item is set later in time than the second common setting item and the first common setting item is of the same priority category as the second common setting item;

a converting step of reading, for generating setting information for one of the plurality of electronic device models, each of the plurality of setting values from the common setting storage unit, referring to constrain information that is dependent on the order in which the user entered each of the plurality of setting values from the common setting storage unit and is to be applied to the one of the plurality of electronic device models, and converting each of the read setting values to a converted setting value to be set for the one of the plurality of electronic device models, and confirming with the user setting values that changed and confirming with the user prior setting values prior to the change in the setting values.

2. The method of claim 1, including categorizing frequently selected setting items as high priority setting items.

3. The method of claim 1, including displaying both low priority and high priority setting items on the entry screen, with high priority items displayed above low priority items.

* * * * *